United States Patent
Chmaytelli

(12) 
(10) Patent No.: US 6,233,464 B1
(45) Date of Patent: May 15, 2001

(54) POWER ON/OFF IN COMBINED PDA/TELEPHONE

(75) Inventor: Mazen Chmaytelli, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/312,237

(22) Filed: May 14, 1999

(51) Int. Cl.⁷ ..................................................... H04B 1/38
(52) U.S. Cl. .......................... 455/556; 455/572; 455/90; 345/179; 713/310
(58) Field of Search .............................. 345/179; 455/550, 455/556, 572, 574, 90; 708/107, 109, 140, 141; 713/310, 321

(56) References Cited

U.S. PATENT DOCUMENTS

| | | | |
|---|---|---|---|
| 5,396,443 | * | 3/1995 | Mese et al. ........................ 364/707 |
| 5,483,262 | * | 1/1996 | Izutani ................................. 345/179 |
| 5,644,628 | * | 7/1997 | Schwarzer et al. ............... 379/93.19 |
| 5,797,089 | * | 8/1998 | Nguyen ............................... 455/403 |
| 5,933,783 | * | 8/1999 | Kawakami et al. ................ 455/550 |
| 5,983,073 | * | 11/1999 | Ditzik ................................. 455/11.1 |
| 6,014,552 | * | 1/2000 | Aiken et al. ......................... 455/90 |

* cited by examiner

*Primary Examiner*—Edward F. Urban
*Assistant Examiner*—Blane J. Jackson
(74) *Attorney, Agent, or Firm*—Philip R. Wadsworth; Charles D. Brown; George C. Pappas

(57) ABSTRACT

A combined Personal Digital Assistant (PDA) (208) and wireless telephone (206) has a switch (204) which, if selected by the user through a user interface (104), will power-on the PDA in response to the stylus being removed from the PDA's stylus holder (106). The switch, also selectably, will power-off the PDA in response to the stylus being replaced into the PDA. The switch further allows selection as to whether either or both of these actions will also turn the telephone on or off. The switch further allows selection as to whether either or both of these actions will also open or close the keypad (108).

8 Claims, 3 Drawing Sheets

POWER ON/OFF IN COMBINED PDA/TELEPHONE

TECHNICAL FIELD

This invention relates to powering on and off a Personal Digital Assistant (PDA), such as a Palm Pilot It has special relation to doing so in response to the stylus being removed or replaced, and in co-ordination with a combined wireless telephone. QUALCOMM Incorporated manufactures such a combination under the trademark "pdQ smartphone".

BACKGROUND ART

A PDA is a computer small and light enough to be carried on the person. It is so small that a full-alphabet keyboard would have keys so small as to be of little use. Accordingly, the PDA includes a removable stylus. The user presses the stylus onto a User Interface (UI). The UI is pressure sensitive to the touch of the stylus, so that the user may enter data. The UI is also a monitor, and thus can display data as well.

The PDA may be combined with a wireless telephone. It is more convenient for the user to have a single device on his belt, rather than having two. Moreover, data may be quickly and accurately transferred between the telephone and PDA. A keypad hinges from the bottom of the PDA. When the keypad is closed, the exterior of the keypad displays the keys which may be pressed to place a telephone call. When closed, the keypad covers some (but not all) of the User Interface. When the keypad is open, the remaining portions of the UI are exposed, and the interior of keypad shows the stylus strokes which may be used to enter data into the UI.

It is important that the power on/off of the telephone be coordinated with the power on/off of the PDA If the telephone is improperly off, a call may be dropped or missed. If the PDA is improperly off, data may be lost. If either or both are improperly on, battery life will be shortened.

BRIEF DISCLOSURE OF THE INVENTION

The present invention provides a switch which, if selected by the user, will power-on the Personal Digital Assistant (PDA) in response to the stylus being removed from the PDA. The switch, also selectably, will power-off PDA in response to the stylus being replaced into the PDA. The switch further allows selection as to whether either or both of these actions will also turn the telephone on or off. The switch further allows selection as to whether either or both of these actions will also open or close the keypad.

DETAILED DESCRIPTION OF THE PREFERRED EMBODIMENTS

Figure 1:
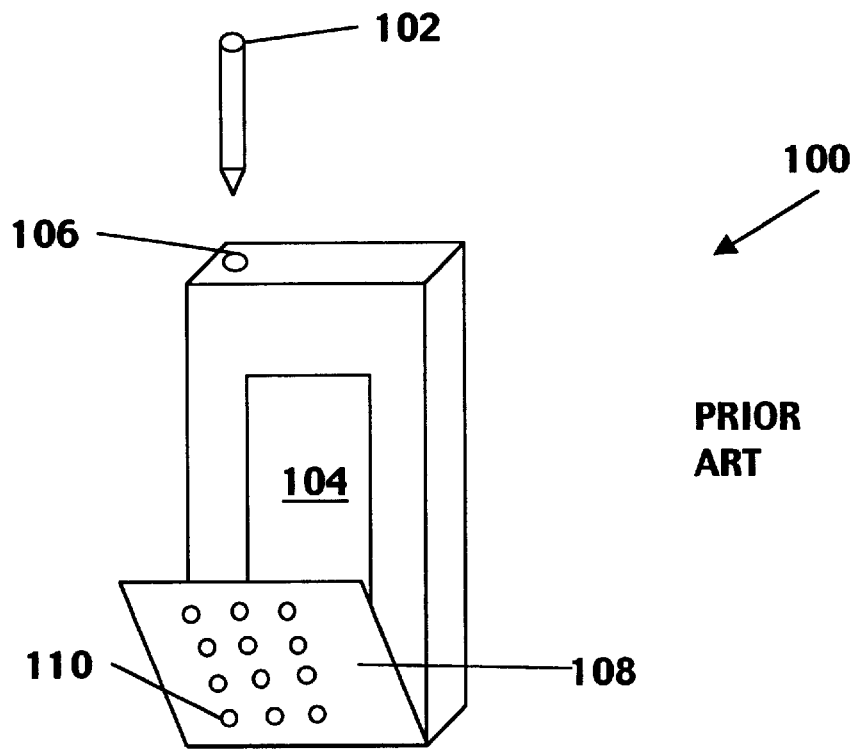
FIG. 1 is a perspective view of a combination Personal Digital Assistant (PDA) and wireless telephone, as is known.

FIG. 1 is a perspective view of a combination (100) Personal Digital Assistant (PDA) and wireless telephone, as is known. A stylus (102) is used to write on a user interface (104), and is held in a stylus holder (106) when not in use. A keypad (108) has keys (110), which are pressed to place calls on the telephone. The keypad hinges from the base of the PDA, and covers some (but not all) of the user interface (UI). When the keypad is open, the remaining portions of the UI are exposed, and the interior of keypad shows the stylus strokes which may be used to enter data into the UI.

Figure 2:
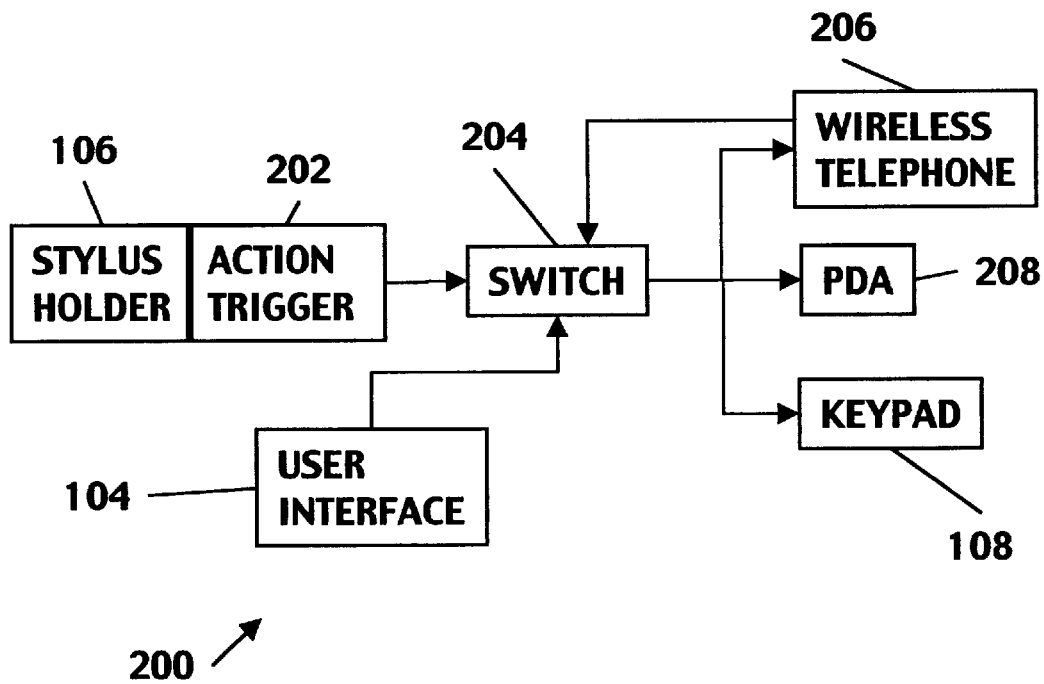
FIG. 2 is a block diagram of the present invention.

FIG. 2 is a block diagram (200) of the present invention. The stylus holder (106) includes an action trigger (202) which sends a signal to a switch (204) when the stylus (102) is removed from the stylus holder, and when the stylus is replaced into the stylus holder. The switch is constructed to power on the wireless telephone (206) in response to the signal from the action trigger that the stylus has been removed from the stylus holder. It is also constructed to power off the wireless telephone in response to the signal from the action trigger that the stylus has been replaced into the stylus holder. These signals may be pulses, to indicate a transition between the removed and replaced states, or continuous indications of the removed or replaced states. In either case, the switch does not take this power-on/power-off action automatically, but only if it has been set to do so. The user may conveniently make such settings through the user interface (104), and the power-on setting may be the same as, or opposite to, the power-off setting.

The switch (204) is also constructed, in response to the same signals from the action trigger (202), to power on or power off the PDA (208). The switch takes these actions, as with the actions which it takes with respect to the wireless telephone (206), only if so set. The user may conveniently use the interface (104) to make these settings for the PDA, just as they were made for lo the wireless telephone. As before, the power on and power off settings for the PDA are independent of each other. They are also independent of the comparable settings for the wireless telephone.

The switch (204) may further be constructed, in response to the same stylus-removal signal, to open the keypad (108). This opening may be no more than a simple unlatching of a latch, so that the keypad opens under its own weight, or in response to a spring. Other opening devices may be used as needed. If the combination PDA and wireless telephone (100) has the switch-controlled capacity to open the keypad, it may also be constructed, in response to the stylus-replacement signal, to close the keyboard. The closing may be a relatching or any other convenient method of closing. As before, the switch is set to enable or disable either or both of these actions.

The switch (204) may additionally be constructed to power off the wireless telephone (100), in response to a replacement of the stylus (102) into the stylus holder (106), only if no telephone call is in progress.

Figure 3:
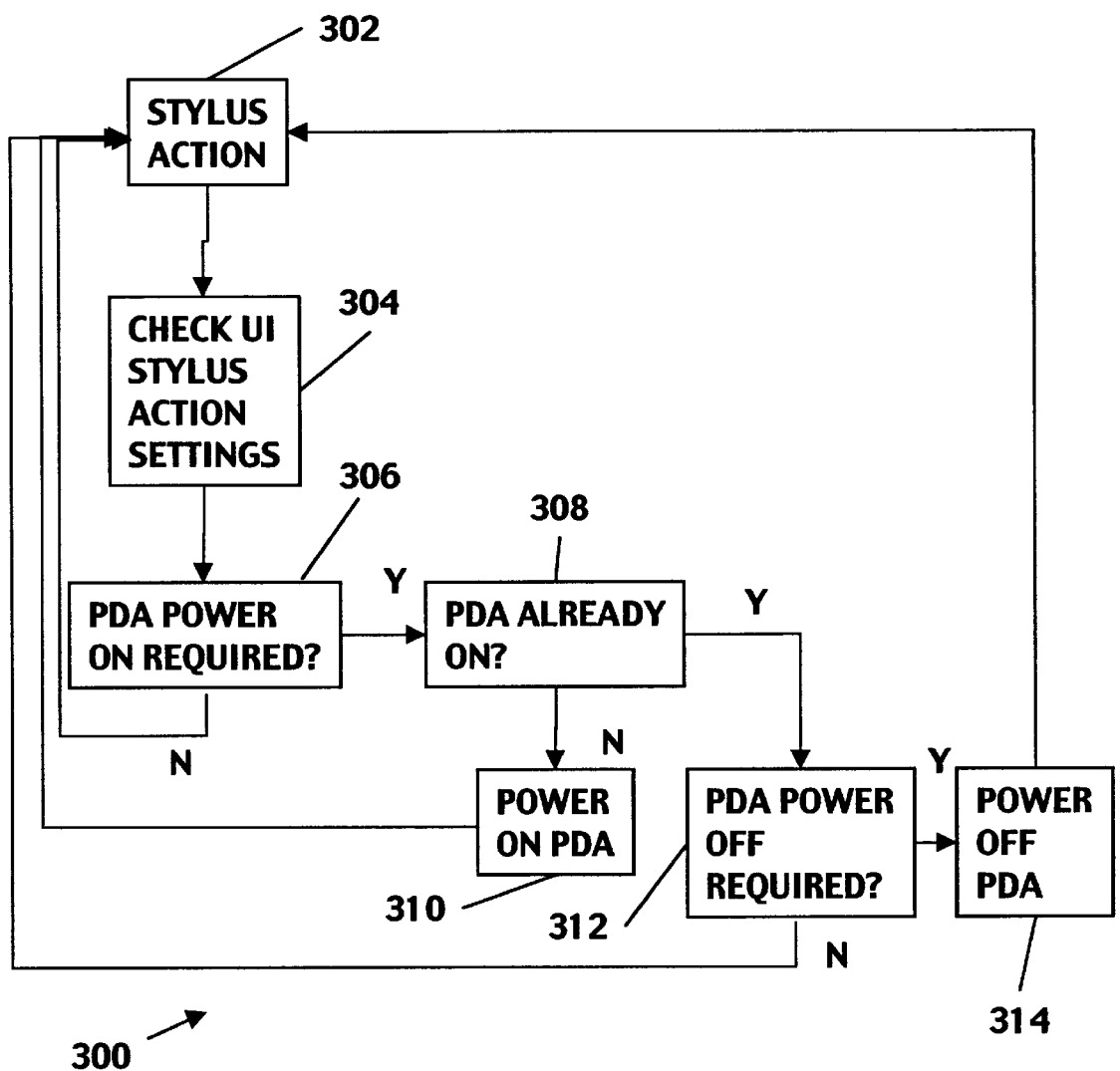
FIG. 3 is a flowchart showing a convenient operation of the present invention with respect to the PDA.

FIG. 3 is a flowchart (300) showing a convenient operation of the present invention with respect to the PDA (208). A stylus action (302)—a removal or replacement of the stylus (102)—is taken. In response (304), the switch (208) checks the user interface stylus action settings, namely, whether the PDA (208) should be powered on or off. If (306) it is not required that the PDA be turned on, we return to waiting for the next stylus action (302). If a PDA turn-on is required, we determine (308) if it already is turned on. If it isn't, we turn it on (310), and return to the next stylus action (302). If it is turned on, we determine (312) if the PDA needs to be turned off. If it does need turn-off, we turn it off (314) and return to stylus action (302). If it does not need turn-off, we return directly to stylus action (302).

It is not required that the user be given the ability to set every possible combination of stylus action settings. For example, only the following options might be offered:

1) Turn PDA ON when stylus is removed; turn PDA OFF when stylus is replaced.
2) Turn PDA ON when stylus is removed; leave PDA ON when stylus is replaced.
3) No action is implemented when removing or replacing the stylus.

Other option combinations may be offered as required.

Figure 4:
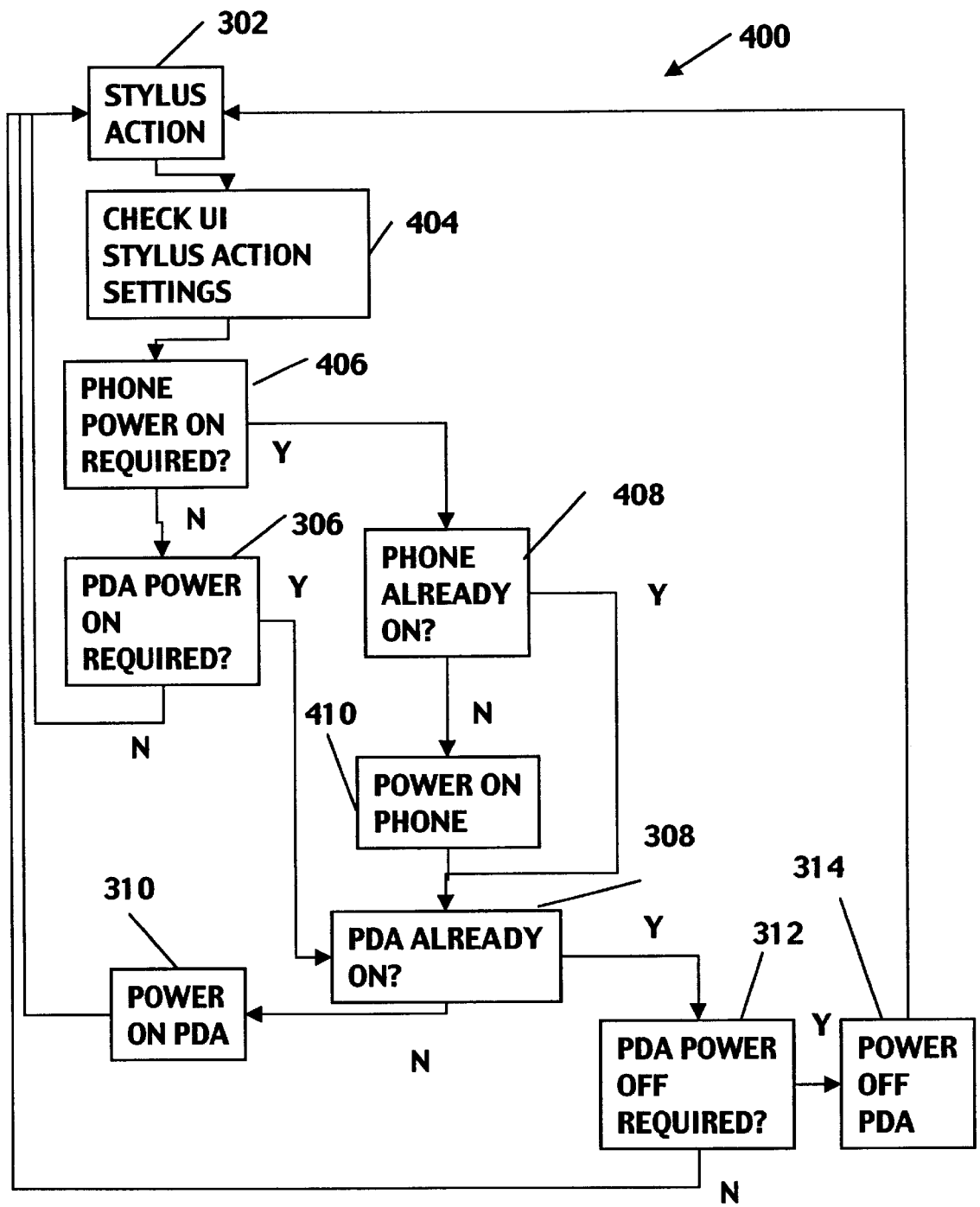
FIG. 4 is a flowchart shoeing a convenient operation of the present invention with respect to both the PDA and the wireless telephone.

FIG. 4 is a flowchart (400) showing a convenient operation of the present invention with respect to both the PDA (208) and the wireless telephone (206). After stylus action (302), the switch (204) checks (404) both user interface stylus action settings. These settings are whether either or both of the PDA (208) and the wireless telephone (206) should be powered on or off. If phone turn-on is required (406), we determine if the phone is already turned on (408), and turn it on if it isn't (410); in either event, we next determine whether the PDA is already turned on (308). If phone turn-on is not required (406), we determine whither PDA turn-on is required, and we return to stylus action if it isn't. If PDA turn-on is required, we ask whether it is already turned on (308).

Regardless of how we came to the determination of whether the PDA is already turned on (308), we turn it on (310) if it is not already on, and then return to stylus action (302). If it is already on, we determine whether turn-off is required (312). If it is, we turn it off (314) and return to stylus action (302). If it isn't, we return to stylus action (302) directly.

As with the method of FIG. 3, it is not required that the user be given the ability to set every possible combination of stylus action settings. For example, only the following options might be offered:

1) Turn PDA and telephone ON when stylus is removed; leave telephone ON and turn PDA OFF when stylus is replaced.
2) Turn PDA and telephone ON when stylus is removed; leave PDA and telephone ON when stylus is replaced.
3) Turn PDA ON when stylus is removed; turn PDA OFF when stylus is replaced.
4) Turn PDA ON when stylus is removed; leave PDA ON when stylus is replaced.
5) No action is implemented when removing or replacing the stylus.

Other option combinations may be offered as required.

Option 1 is suitable when the user is in his car and wishes to place a call to a friend. Removing the stylus turns on the PDA (so that the user may select which friend he wishes to call) and the telephone (so that a tap of the stylus on the user interface can start placing the call). Once the call has started to be placed, the user can replace the stylus without disconnecting the call. Replacing the stylus keeps the stylus from getting lost. Turning off the PDA extends battery life.

Option 2 is suitable in the same situation as option 1, except that the user anticipates using the PDA during the call Option 3 is suitable when the user wishes to use the PDA much more than the telephone, and anticipates numerous brief uses. Tuning off the PDA between uses extends battery life.

Option 4 is suitable when the user wishes to use the PDA fairly continuously, but does not wish to lose the stylus.

Option 5 is suitable when the stylus has a low risk of being lost if kept out of the PDA, and the user prefers to use more conventional controls to power on and off the PDA and telephone.

It is usually preferred that the stylus not be the only control for powering on and off the PDA and telephone, and that more conventional controls be retained, if only as a back up. If desired, however, conventional controls may be omitted.

It is likewise usually preferred that the switch be configurable by the user. However, the manufacturer may fix the power-on and power-off of the PDA and telephone in response to the removal or replacement of the stylus, as by hardware, firmware, or the like.

INDUSTRIAL APPLICATION

My invention is capable of exploitation in industry, and can be made and used, whenever is it desired to stylus-control the power on and power off of a combined Personal Digital Assistant and wireless telephone. The individual components of the apparatus and method shown herein, taken separate and apart from one another, may be entirely conventional, it being their combination which I claim as my invention:

While I have described various modes of apparatus and method, the true spirit and scope of my invention are not limited thereto, but are limited only by the following claims and their equivalents, and I claim such as my invention.

What is claimed is:

1. A method for operating a Personal Digital Assistant (PDA), wherein:
    (a) the method includes the action of removing a stylus from the PDA or replacing the stylus into the PDA; and
    b) the method is characterized in that if further includes the activities of:
        (1) in response to a stylus removing or replacing action, checking at least one user interface stylus action setting;
        (2) if the setting indicates that a PDA power on is required, then determining if the PDA is already on;
        (3) if the setting indicates that a PDA power on is not required, then returning to the stylus action activity (a);
        (4) if the PDA already on activity (2) indicates that the PDA is not already on, then powering on the PDA, and returning to the stylus action activity;
        (5) if the PDA already on activity (2) indicates that the PDA is already on, then determining if a PDA power off is required;
        (6) if a PDA power off (5) is required, then powering off the PDA and returning to the stylus action activity (a); and
        (7) if a PDA power off (5) is not required, then returning to the stylus action activity (a).

2. The method of claim 1, further characterized in that the checking activity includes checking less than every possible user interface stylus action setting.

3. The method of claim 2, further characterized in that the checking activity includes checking only the following user interface stylus action settings:
    (a) turn PDA ON when stylus is removed; turn PDA OFF when stylus is replaced;
    (b) turn PDA ON when stylus is removed; leave PDA ON when stylus is replaced; and
    (c) no action is implemented when removing or replacing the stylus.

4. A method for operating a combined Personal Digital Assistant (PDA) and wireless telephone, wherein:
    (a) the method includes the action of removing a stylus from the PDA or replacing the stylus into the PDA; and
    (b) the method is characterized in that if further includes the activities of:

(1) in response to a stylus removing or replacing action, checking at least one user interface stylus action setting;
(2) if the setting indicates that a telephone power on is required (1), then determining if the telephone is already on;
(3) if the setting indicates that a telephone power on is not required (1), then determining if a PDA power on is required;
(4) if a PDA power on is not required (3), then returning to the stylus action activity (a);
(5) if the setting indicates that a PDA power on is required (3), then determining if the PDA is already on;
(6) if the telephone is already on (2), then determining if the PDA is already on;
(7) if the telephone is not already on (2), then powering on the telephone and determining if the PDA is already on;
(8) if the PDA is not already on (5, 6, 7), then powering on the PDA and returning to the stylus action activity (a).
(9) if the PDA is already on (5, 6, 7), then determining if a PDA power off is required;
(10) if a PDA power of is not required (9), then returning to the stylus action activity (a);
(11) if a PDA power off is required (9), then powering off the PDA and returning to the stylus action activity (a).

5. The method of claim 4, further characterized in that the checking activity includes checking less than every possible user interface stylus action setting.

6. The method of claim 5, further characterized in that the checking activity includes checking only the following user interface stylus action settings:

(a) turn PDA and telephone ON when stylus is removed; leave telephone ON and turn PDA OFF when stylus is replaced;

(b) turn PDA and telephone ON when stylus is removed; leave PDA and telephone ON when stylus is replaced;

(c) turn PDA ON when stylus is removed; turn PDA OFF when stylus is replaced;

(d) turn PDA ON when stylus is removed; leave PDA ON when stylus is replaced; and no action is implemented when removing or replacing the stylus.

7. A combination of a Personal Digital Assistant (PDA) and a wireless telephone comprising a stylus, a stylus holder having an action trigger, and a switch, the action trigger and switch being communicably adapted to power on/off at least the wireless telephone in response to the stylus being placed in and out of the stylus holder, the action trigger and switch further being communicably adapted to identify a telephone call in progress, and in response thereto, not power off the wireless phone.

8. The combination of claim 7, wherein the combination further comprises a keypad, the action trigger and switch being communicably adapted to open or close the keypad.

* * * * *